Feb. 10, 1931.  O. WERNER  1,791,857
AERIAL DISPLAY APPARATUS
Filed Feb. 19, 1930
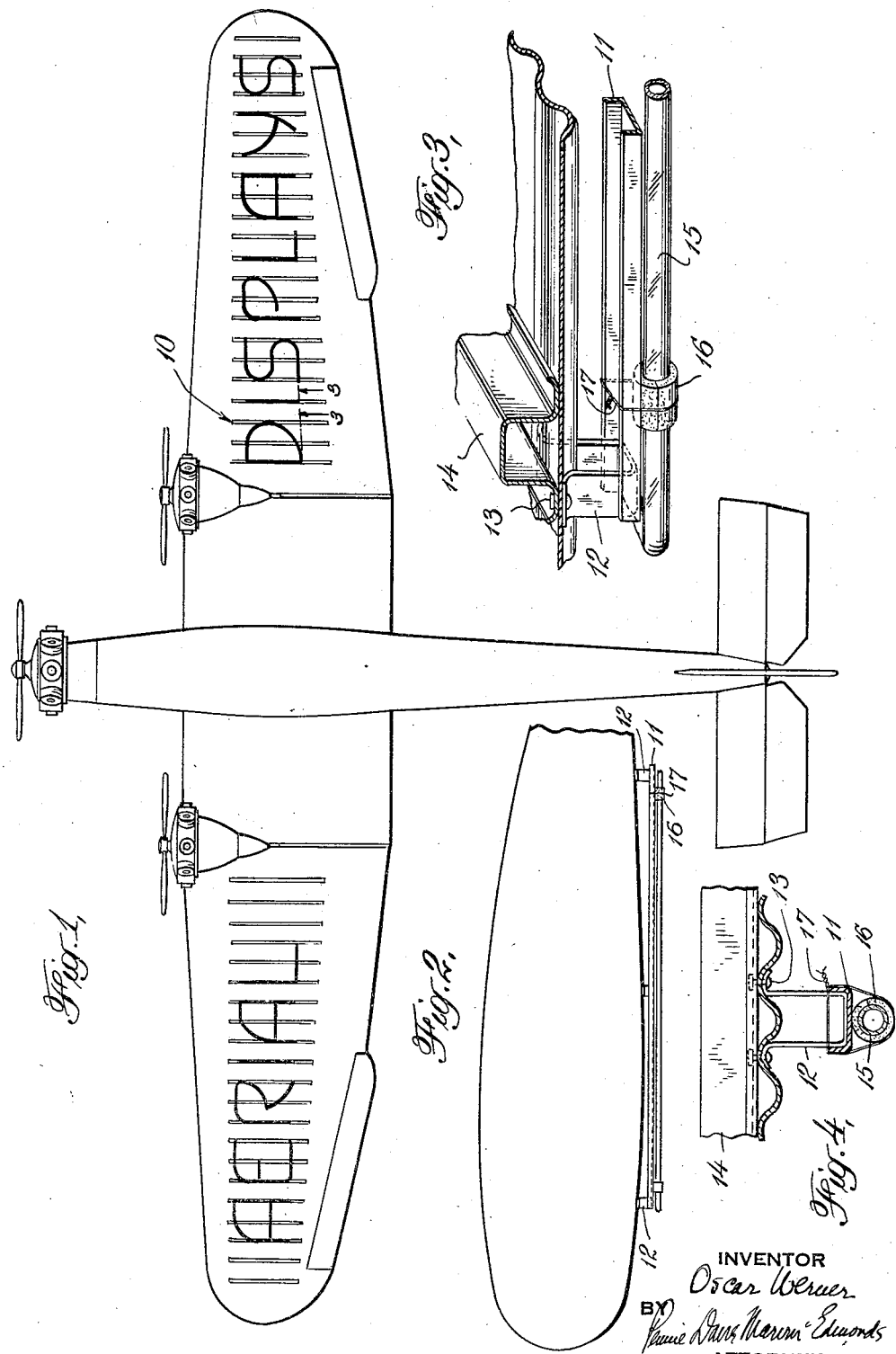

Patented Feb. 10, 1931

1,791,857

UNITED STATES PATENT OFFICE

OSCAR WERNER, OF SOUTH BEND, INDIANA, ASSIGNOR TO RAINBOW LIGHT, INC., OF LONG ISLAND CITY, NEW YORK, A CORPORATION OF NEW YORK

AERIAL DISPLAY APPARATUS

Application filed February 19, 1930. Serial No. 429,709.

This invention relates to aerial displays for advertising and similar purposes, and is concerned more particularly with display apparatus which includes electric discharge tubes, such as neon tubes.

Airplanes having electric discharge tubes attached to the under surface of the lower wing, have been used heretofore to some extent for advertising purposes, the tubes being shaped to form letters or other symbols which convey the advertising message. Since these tubes are delicate and fragile, difficulties have been encountered in attaching the tubes to the airplane wings in such a way that the tubes are afforded the desired degree of protection and the aero-dynamic performance of the wing surfaces is not interfered with.

The object of this invention is to provide an aerial display apparatus including luminous discharge tubes and means for attaching them in position on an airplane wing in such fashion that they can readily be removed and replaced to alter the advertising message and when in place are protected against injury. This apparatus is so constructed that the tube mounting may be permanently attached in position on the wing and the presence of the mounting does not interfere with the performance of the airplane and adds only an insignificant weight thereto.

For a better understanding of the invention, reference may be had to the accompanying drawings, in which Fig. 1 is a bottom plan of an airplane with the apparatus of the invention in position under the wing surface;

Fig. 2 is a partial end view;

Fig. 3 is a sectional view in perspective on the line 3—3 of Fig. 1; and

Fig. 4 is a sectional end view of the parts illustrated in Fig. 3.

In these drawings, the apparatus is shown installed on the under surface of the wing of a monoplane of the three-motor type. It will be understood that this airplane is shown merely for purposes of illustration and that the utility of the invention is not limited to any particular kind of airplane.

Mounted on the under surface of each wing and on the under surface of the fuselage, if desired, are stringers 10, each stringer preferably being made in the form of a channel strip 11 of aluminum or other light material of that sort. These stringers are placed with their lengths parallel to the direction of flight and each stringer is secured to the under surface of the wing structure in any convenient manner, for instance, by U-shaped supports 12. Preferably the supports are attached to the wing surface in such a way that the attaching means, which may be bolts 13, pass through the wing fabric and into a structural member 14 of the wing. The under contour of the wing is curved, as illustrated in Fig. 2, and the wing tapers in thickness from the fuselage toward the tip, but the stringers on each wing are all mounted so that their lower surfaces lie in a plane and accordingly the length of the supports 12 by which a stringer is attached to the wing will vary. Also, each support is of sufficient length so that the stringer to which it is attached lies at a substantial distance from the under surface of the wing, so that the stringers do not alter the contour of the wing surface and thus change its aero-dynamic characteristics.

Since the stringers and supports are of thin material such as light sheet metal, and they are placed edge on in the direction of flight, the head resistance offered by the stringers and supports is unimportant.

The tubes 15 which produce the display are secured to the stringers in any convenient manner. For example, each tube may be provided with split rubber rings 16 surrounding the tube and lying in contact with the stringer, the tube being secured to the stringer by binding wires 17. The rubber rings permit the tubes to be securely held in position and at the same time cushion them against shock.

The stringers lie in a row with adjacent stringers relatively closely spaced so that they provide a suitable means of support for tubes of different sizes and shapes. Where the tubes are bent to form letters, the spacing of the stringers and the size of the letters will preferably be co-ordinated so that all parts of the tubes can be directly connected to a stringer. For example, the letter "I" can be secured to a single stringer, while the letter "D" will have its upright bar attached to one stringer and the remainder extending across and attached to two adjacent stringers. The letter "L" may be mounted either on two or three stringers, the upright portion extending lengthwise of one stringer and the lateral bar extending across the next stringer and if desired to the second adjacent stringer to be attached thereto. The letters "M" and "W" may occupy four stringers. By thus correlating the spacing of the stringers and the size of the letters, the letters may be changed and the proper spacing between letters, so necessary for good readability, may be obtained without changing the relative position of the stringers.

The mounting means for the tubes can be permanently attached to the wings of the airplane and by reason of the light weight of the parts, their low head resistance and their spacing wing from the surface, their presence does not affect the performance of the plane. When the plane is to be used for display purposes, tubes in the form of letters spelling out the words of the message or in the form of symbols, such, for example, as a trade-mark, may be readily attached in place. When the message is to be changed, the tubes are removed and others substituted for them. This replacement of the tubes involves no change in the stringers or their supports and the tubes can be quickly and safely secured in position throughout the display surface. As the stringers all form one plane, it is merely necessary that the tubing forming the letters be flat, a condition which is easily met by ordinary manufacturing methods. Similar stringers may also be placed at the bottom of the fuselage to permit luminous tubes to be mounted thereon. These stringers may be of wood or of metal.

I claim:—

1. The combination with a wing of an airplane of a plurality of supports mounted on the under surface of the wing, these supports being of sheet metal and lying with their edges opposed to the direction of flight, a plurality of members mounted on said supports, said members being of sheet metal and extending parallel and edgewise to the direction of flight, and luminous tubes attached to said members.

2. The combination of an airplane, a plurality of U-shaped brackets the legs of which are connected to said airplane, a plurality of parallel channel-shaped members lying in the direction of flight and attached to said U-shaped brackets in such a manner that the bottom of the U of each of the U-shaped brackets is in the channel of a channel member, and luminous tubes supported on said channel members.

3. The combination of an airplane, a plurality of U-shaped brackets the legs of which are connected to said airplane, a plurality of parallel channel-shaped members lying in the direction of flight and attached to said U-shaped brackets so that the bottom of the U of the brackets is in the channel of a channel member, and luminous tubes supported on said channel members, at least some of the said tubes being attached to a plurality of channel members.

4. The combination with an airplane of a series of parallel elongated members lying parallel to the direction of flight, each member being completely separate and having separate means for permanently supporting it from the airplane, luminous tubes forming a design to be displayed and means for removably fastening said tubes to said elongated members, said tubes having each of their ends adjacent and supported upon one of said parallel members.

5. The combination with an airplane of a series of parallel elongated members lying parallel to the direction of flight, each member being completely separate and having separate means for permanently supporting it from the airplane, luminous tubes forming a design to be displayed and means for removably fastening said tubes to said elongated members, at least some of said tubes being attached to a plurality of elongated members, said tubes having each of their ends adjacent and supported upon one of said parallel members.

6. The combination with a wing of an airplane of a plurality of sheet metal brackets mounted on the under surface of the wing and lying with their edges in the direction of flight, a plurality of channel-shaped members lying in the direction of flight and attached to said brackets and luminous tubes supported on said channel members.

In testimony whereof I affix my signature.

OSCAR WERNER.